Feb. 14, 1928.
S. OWEN ET AL
1,659,470
SPRINKLER
Filed April 6, 1926
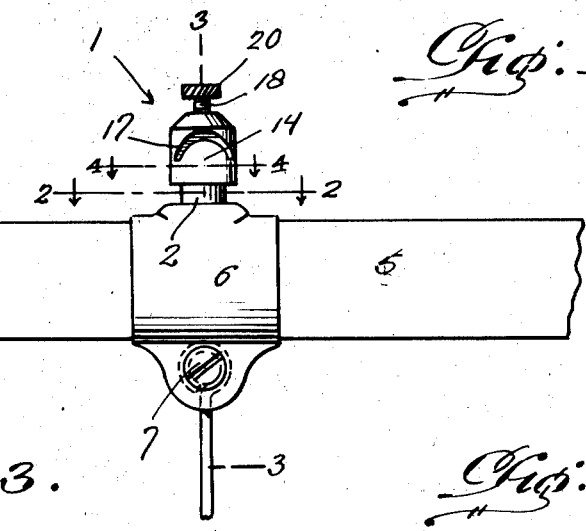
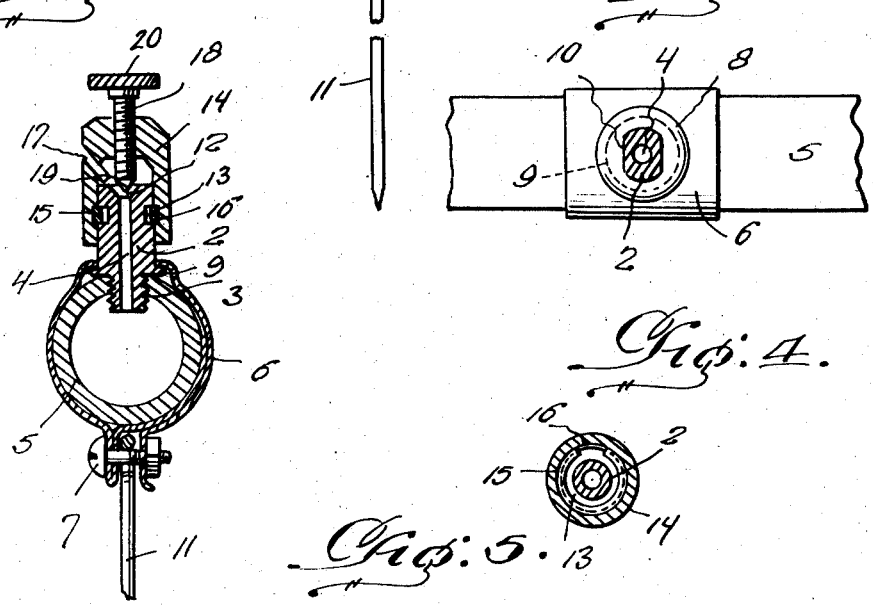
Inventors
S. Owen,
W. F. Roberts,
By Clarence A. O'Brien
Attorney Patented Feb. 14, 1928.

1,659,470

UNITED STATES PATENT OFFICE.

SIDNEY OWEN AND WILLIAM F. ROBERTS, OF PHOENIX, ARIZONA.

SPRINKLER.

Application filed April 6, 1926. Serial No. 100,102.

The present invention relates to improvements in sprinklers for use in connection with a lawn sprinkler system and has for its principal object to provide a sprinkler unit which may be readily and easily rotated to throw the water or spray in any desired direction.

Another important object of the invention is to provide a sprinkler of the above mentioned character which includes a water regulator for controlling the flow of water which is to be discharged from the sprinkler unit through the discharge orifice.

A further object is to provide a sprinkler of the above mentioned character which will save considerable time and labor in watering the lawn of a garden, the same being further simple in construction, inexpensive, strong, and durable, and further well adapted to the purpose for which it is designed.

Other objects and advantages of the invention will become apparent during the course of the following description taken in connection with the accompanying drawing.

In the accompanying drawing forming a part of this application, and in which like numerals designate like parts throughout the several views:

Figure 1 is a side elevation of one of the sprinkler units showing the manner in which the same is attached to a garden hose.

Figure 2 is a sectional view taken substantially on line 2—2 of Figure 1 looking in the direction of the arrows.

Figure 3 is a vertical section taken approximately on line 3—3 of Figure 1.

Figure 4 is a transverse section taken approximately on line 4—4 of Figure 1, and Figure 5 is a similar section of a modification.

In the drawing wherein for the purpose of illustration is shown the preferred embodiment of our invention, the numeral 1 designates generally the sprinkler unit embodying our invention, it being understood of course that a number of these sprinkler units are adapted to be attached to a garden hose at spaced intervals whereby a gang sprinkling system will be provided.

The sprinkler unit comprises the cylindrical body 2, the same having formed on its lower end the reduced threaded portion 3 which provides a means for attaching a unit to a hose, the hose being pierced to accommodate the threaded portion 3 of the body 2. This body is further provided with the central bore 4 which extends for the full length of the body and also extends through the reduced portion 3, thus affording communication between the garden hose 5 and the body 2.

For the purpose of properly supporting the body 2 in an upright position on the hose, there is provided the metallic clamp 6 which encircles the garden hose, and a suitable securing means such as is shown at 7 extends through the laterally disposed portions of the band for holding the same securely on the hose. The specific construction will not be described for the reason that any form of clamp well known in the art may be used in connection with the sprinkler unit. The upper portion of the clamp is slightly raised as indicated at 8 and disposed beneath the raised portion of the clamp is the annular flange 9 formed on the lower portion of the body 2. The body 2 has its opposite sides flattened as illustrated at 10 in Figure 2 of the drawing, and this flattened portion is preferably formed at the lower end portion of the body for cooperation with the flattened sides of the opening formed in the raised portion 8 of the clamp 5 to prevent the rotation of the body after the same has been once positioned or attached on the hose.

For the purpose of further maintaining the sprinkler unit in an upright position on the garden hose, there is associated with the securing means 7 of the clamp 6 the stake or spike 11, the pointed end thereof being adapted to be driven downwardly into the ground so that the hose will lie rigidly on the lawn.

The upper end of the central bore 4 formed in the body 2 terminates in the conically shaped valve seat 12, as is clearly illustrated in Figure 3. An annular groove 13 is formed in the outer wall of the body 2 adjacent the upper end thereof as is also clearly shown in Figure 3, and the purpose thereof will be presently apparent.

The sprinkler unit further includes a cap member 14, the same being adapted to fit over the body 2 and being further frictionally rotatable on the body. Various means may be associated with the body and cap for locking the same against displacement with respect to each other, and in the preferred form of the invention, there is provided an expansible split ring 15, which is adapted to be seated in the annular groove 13 formed in the body 2, and normally this expansible split ring will have its outer portion disposed in the annular groove 16 in the inner wall of the cap 14, and which is adapted to be arranged in alignment for registry with the annular groove 13. It being understood of course that the annular groove 13 is of a greater depth than the groove 16.

In assembling the cap on the body, the split expansible ring 13 is compressed so as to be entirely confined within the annular groove 13, and when the cap is positioned over the body so that the groove 16 formed in the cap is in registry with the groove 13, the split ring will of its own accord expand and be positioned in the registering grooves in the manner clearly shown in Figure 3. This will prevent the vertical displacement of the cap member 14 with respect to the body 2, yet will not prevent the manual rotation of the cap member on the body for the purpose to be also hereinafter more fully described.

The cap 14 is provided with the discharge orifice 17, the same being formed in one side of the cap commencing near the closed upper end thereof and extending downwardly and inwardly and terminating in close proximity to the upper end of the body 2 adjacent the valve seat 12. This construction is clearly illustrated in Figure 3 of the drawing, and by forming a discharge orifice or passage in the manner as shown and described, a substantially fan shaped spray of water will be discharged from the sprinkler unit.

For the purpose of controlling or regulating the supply of water which is discharged out through the orifice 17, there is provided the threaded valve stem 18, the same being threaded through the upper end of the cap 14. A conical shaped valve 19 is associated with the lower end of the valve stem and the same is adapted for cooperation with the conical valve seat 12. An actuating thumb piece 20 is carried by the upper end of the valve stem and it is obvious that when the thumb piece 20 is rotated in one direction, the valve stem 18 will move downwardly in the upper portion of the cap 14 so that the conical valve head 19 formed on the lower end of the stem will seat on the valve seat 12, thus entirely cutting off the supply of water from the hose, and preventing the same being discharged out through the orifice 17. The valve may be adjusted so that either a fine or coarse spray may be obtained, In Figure 5 of the drawing, a modification of the cap securing means is shown wherein instead of using the expansible split ring 15, there is employed a cross locking pin 21 which is disposed through a pair of oblique arranged openings formed in the cap 14, it being understood of course that these openings are formed in alignment with the annular groove formed in the body 2. This cross pin 21 will not however prevent the rotation of the cap member 14, but will prevent any possibility of the cap being vertically movable on the body.

As heretofore stated, a number of these units may be attached to a garden hose at spaced intervals and each of the units when properly adjusted will cause a substantially fan shaped spray to be discharged so that the lawn may be more readily and easily watered. By simply rotating the cap 14 on the body 2, the water or spray may be caused to be thrown into any desired direction. The simplicity in which our improved sprinkler is constructed enables the same to be manufactured at a very low cost and may be furthermore readily and easily assembled and also attached to a garden hose and will furthermore be at all times positive and efficient in carrying out the purposes for which it is designed.

While we have shown the preferred embodiment of the invention it is to be understood that minor changes in the size, shape, and arrangement of parts may be resorted to without departing from the spirit of the invention and the scope of the appended claims.

Having thus described the invention, what we claim as new and desire to secure by Letters Patent is:—

1. A sprinkler unit comprising a cylindrical body, flanged at its lower end, a nipple depending from the bottom of the cylindrical body and adapted to extend into the side of a hose, a clamp for encircling a hose and provided with a recess through which the cylindrical body extends, said clamp engaging the flanged portion for supporting the body against displacement when mounted in a hose, said body and nipple being formed with a central bore, and a discharge orifice.

2. A sprinkler unit comprising a cylindrical body, flanges at its lower end, a nipple depending from the bottom of the cylindrical body and adapted to extend into the side of a hose, a clamp for encircling a hose and provided with a recess through which the cylindrical body extends, said clamp engaging the flanged portion for supporting the body against displacement when mounted in a hose, said body and nipple being formed with a central bore, a cap enclosing the upper portion of the cylindrical body, said cap being provided with a discharge orifice adapted for communication with said bore.

3. A sprinkler unit comprising a cylindrical body having its lower end flanged, a nipple formed on the bottom of the cylindrical body adapted to extend into the side of a hose, a clamp for encircling a hose and provided with an opening to accommodate the cylindrical body, said clamp engaging the flange on the lower end of the cylindrical body for securing the same on the hose, said cylindrical body being formed with a central bore, the upper end of which terminates in a valve seat, a cap member enclosing the upper portion of the body member and adapted for rotation thereon, cooperating means between the cylindrical body and the cap member for preventing the displacement of said cap member from the cylindrical body, the top of the cap being spaced from the upper end of the cylindrical body, the upper portion of said cap member having a discharge orifice formed in the side thereof and communicating with the upper end of the bore formed in the cylindrical body, a valve stem threaded through the top of the cap, the lower end thereof forming a valve for cooperation with the valve seat, and a thumb piece on the upper end of the valve stem for actuating the same to control the flow of water from the bore of the body to the discharge orifice.

In testimony whereof we affix our signatures.

SIDNEY OWEN.
WILLIAM F. ROBERTS.